(12) United States Patent
Maihoefer

(10) Patent No.: US 9,537,563 B2
(45) Date of Patent: Jan. 3, 2017

(54) AUTOMATED METHOD FOR COUPLING A MOBILE COMMUNICATION TERMINAL TO A CENTRAL COMPUTATION UNIT IN A MOTOR VEHICLE

(75) Inventor: Christian Maihoefer, Iggingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/343,001

(22) PCT Filed: Jul. 28, 2012

(86) PCT No.: PCT/EP2012/003220
§ 371 (c)(1),
(2), (4) Date: Mar. 5, 2014

(87) PCT Pub. No.: WO2013/034221
PCT Pub. Date: Mar. 14, 2013

(65) Prior Publication Data
US 2014/0227979 A1 Aug. 14, 2014

(30) Foreign Application Priority Data
Sep. 6, 2011 (DE) .................. 10 2011 112 626

(51) Int. Cl.
*H04B 7/00* (2006.01)
*H04B 7/26* (2006.01)
*H04W 12/06* (2009.01)
*H04W 4/20* (2009.01)
*H04W 84/18* (2009.01)
(Continued)

(52) U.S. Cl.
CPC ............... *H04B 7/26* (2013.01); *H04L 63/18* (2013.01); *H04W 4/206* (2013.01); *H04W 12/06* (2013.01);
(Continued)

(58) Field of Classification Search
CPC .......... H04B 7/26; H04W 12/06; H04W 4/046
(Continued)

(56) References Cited

U.S. PATENT DOCUMENTS 6,148,253 A * 11/2000 Taguchi ............. G01C 21/3688
370/310
7,826,945 B2 * 11/2010 Zhang ...................... G06F 3/16
701/36
(Continued)

FOREIGN PATENT DOCUMENTS

CN         1920946 A       2/2007
DE   10 2008 017 946 A1   11/2009
(Continued)

OTHER PUBLICATIONS

German-language Written Opinion (PCT/ISA/237) dated Nov. 14, 2012 (Five (5) pages).
(Continued)

*Primary Examiner* — Eugene Yun
(74) *Attorney, Agent, or Firm* — Crowell & Moring LLP

(57) ABSTRACT

A method for the automated coupling of a mobile communication terminal with a central computing unit of a motor vehicle involves the mobile communication terminal communicating with a server to exchange pairing information. The central computing unit of the vehicle and an internet server exchange the pairing information. The mobile terminal then transmits the pairing information to the central computing unit of the vehicle, which then identifies and authenticates the mobile communication terminal using the pairing information and allows a coupling of the mobile communication terminal with the central computing unit of the vehicle.

12 Claims, 1 Drawing Sheet

(51) Int. Cl.
  *H04L 29/06* (2006.01)
  *H04W 4/04* (2009.01)
  *H04W 12/04* (2009.01)

(52) U.S. Cl.
  CPC ............ *H04W 84/18* (2013.01); *H04L 63/168* (2013.01); *H04W 4/046* (2013.01); *H04W 12/04* (2013.01)

(58) Field of Classification Search
  USPC ................................ 455/41.2, 575.9, 99, 345
  See application file for complete search history.

(56) References Cited

U.S. PATENT DOCUMENTS

2007/0005206 A1   1/2007   Zhang et al.
2009/0178128 A1   7/2009   Chiba et al.
2010/0256861 A1   10/2010  Hodges

FOREIGN PATENT DOCUMENTS

| DE | 10 2009 037 234 A1 | 2/2011 |
| DE | 10 2010 055 372 A1 | 8/2011 |
| DE | 10 2010 055 375 A1 | 8/2011 |
| WO | WO 2010/000262 A1  | 1/2010 |

OTHER PUBLICATIONS

International Search Report with English translation dated Nov. 14, 2012 (Five (5) pages).

English translation of Chinese Office Action issued in Chinese counterpart application No. 201280043311.5 mailed on Apr. 5, 2016 (Six pages).

* cited by examiner

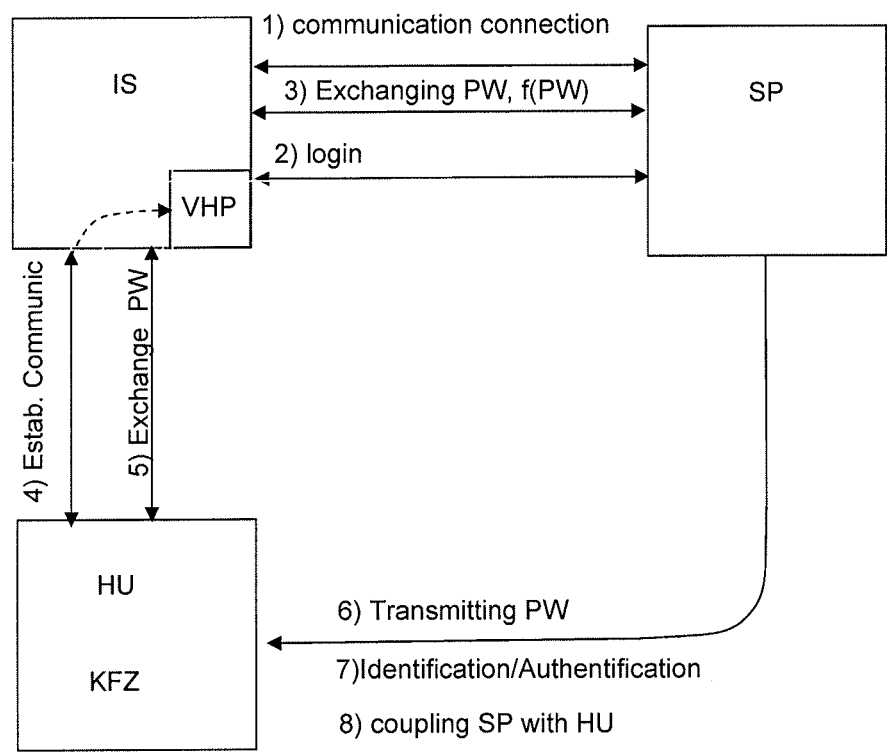

AUTOMATED METHOD FOR COUPLING A MOBILE COMMUNICATION TERMINAL TO A CENTRAL COMPUTATION UNIT IN A MOTOR VEHICLE

BACKGROUND AND SUMMARY OF THE INVENTION

Exemplary embodiments of the invention relate to a method, by means of which a mobile communication terminal can be coupled automatically with a central computing unit of a motor vehicle.

Vehicle applications such as, for example, navigation, telephony, audio and visual sources, the communication connection thereof and the use thereof for other vehicle applications are processed together in the "head unit", a central computing unit with communication devices and interfaces in the vehicle.

Here, the coupling of the head unit with a so-called "vehicle homepage" of a vehicle is of more and more significance, which homepage is operated, for example, by the vehicle manufacturer and provides a plurality of further services. A "vehicle homepage" offers a virtual representation of a vehicle on the internet, which enables the user or the vehicle owner to have access to vehicle data from the internet. The "vehicle homepage" is operated on an internet server and can be accessed independently from the vehicle, so it can be accessed even when the vehicle is switched off. In this case, however, the topicality of the vehicle data is not always ensured. At present, a "vehicle homepage" is used, for example, for electric vehicles and is used for the remote querying of the state of charge of the batteries. It can, however, also be expanded for further configuration and information queries.

Furthermore, such applications of the vehicle homepage of a vehicle can be coupled with the use of an internet-enabled communication terminal, such as a smartphone, via the central computing unit. Since, from a technical standpoint, the vehicle homepage establishes a connection between a vehicle on the one side and a user on the other, it is necessary for the vehicle to typically be able to be identified by a unique reference/identity number from the vehicle homepage, and, on the other hand, for an identification of the user to typically take place via a name/password combination. If the user wishes to gain access to the vehicle homepage via a communication terminal such as the smartphone, the user must therefore register the smartphone twice: once for use in the vehicle for the purpose of pairing with the vehicle and, once to log in to use the vehicle homepage. This is a time-consuming matter that typically takes time and is inconvenient.

Exemplary embodiments of the present invention provide a method that is comfortable for a user, which enables a mobile communication terminal such as a smartphone to be coupled with a central computing unit of a motor vehicle automatically and securely, and without a manual login procedure.

The method according to the invention for the automated coupling of a mobile communication terminal with a central computing unit of a motor vehicle uses a virtual representation area of the vehicle, which is present on a vehicle home page that is provided by a server. The method comprises the following steps:

establishing a communication connection between the mobile communication terminal and the internet server and logging in with the mobile communication terminal into the virtual representation area of the motor vehicle on the vehicle home page, exchanging pairing information, so that a "secret" between the internet server and the mobile communication terminal is established, then establishing a communication connection between the central computing unit and the internet server for data exchange between the central computing unit and the virtual representation area of the motor vehicle on the vehicle home page, exchanging the pairing information between the internet server and the central computing unit, transmitting the pairing information to the central computing unit through the mobile communication terminal, identifying and authenticating of the mobile communication terminal by the central computing unit by means of the pairing information, and finally allowing the coupling of the mobile communication terminal with the central computing unit.

In this way, a user can, advantageously, conveniently gain access to the vehicle homepage via a communication terminal such as the smartphone and use its service without having to register the smartphone twice, since the pairing is needed, according to the invention, only once.

The method can comprise the implementation of an algorithm for the processing of the pairing information by the central computing unit and the mobile communication terminal, in conjunction with the acquisition of a piece of processed information. Then the transmission of the pairing information of the basic method corresponds to the transmission of the processed information, and the identification and authentication of the mobile communication terminal is carried out by the central computing unit by means of the processed information.

In the method according to the invention, the exchange of information between the internet server and the mobile communication terminal and between the internet server and the central computing unit follows the transmission of the pairing information from:

the central computing unit to the internet server and to the mobile communication terminal, the internet server to the central computing unit and to the mobile communication terminal or the mobile communication terminal to the internet server and to the central computing unit.

Furthermore, the method can comprise the steps of defining or generating the pairing information in advance using the central computing unit or the internet server or the mobile communication terminal, then filing the pairing information on the server and linking it to the virtual representation area of the motor vehicle and finally saving the pairing information on the central computing unit of the motor vehicle.

Furthermore, the method can comprise the expiry of validity of the pairing information taking place after the expiry of an access right of the mobile communication terminal onto the virtual representation area of the motor vehicle on the vehicle home page or after the removal of the virtual representation area on the vehicle home page. The deletion of the pairing information can be carried out on the internet server (IS) and/or the central computing unit and/or the mobile communication terminal after the coupling between the central computing unit and the communication terminal has ended.

In this way, the disconnection of a communication connection or the disconnection of a coupling inherently entails the other. If a vehicle renter or customer deletes his/her account on the vehicle homepage, the telephone should thus also no longer be approved for the use of the hands-free equipment.

During the disconnection of the coupling of the mobile communication terminal and the central computing unit, an access denial message is sent to the internet server by the central computing unit of the motor vehicle and a repeat access of the mobile communication terminal to the virtual representation area can be denied if the mobile communication terminal is not coupled again with the central computing unit of the motor vehicle.

Finally, cancellation conditions can also be configured at a desired point in time or event: The configuration of a cancellation condition of the automatic coupling between the mobile communication terminal and the central computing unit can be carried out directly on the central computing unit or via the mobile communication terminal or via the virtual representation area on the server by cancellation conditions being defined.

The method can furthermore comprise the configuration of the automatic coupling between the mobile communication terminal and the central computing units of several vehicles. Here, this leads to an exchange of pairing information or pieces of pairing information between the internet server and the central computing unit of the vehicles and to the exchange of pairing information or pieces of pairing information between the internet server and the mobile communication terminal.

In this case, some or all of the vehicles form a vehicle group, or rather a pool, to which pairing information for all vehicles is allocated.

In this way, for example, all "car2go" vehicles of a car2go pool could essentially be approved.

Furthermore, the automatic coupling between the mobile communication terminal and the central computing unit of one or more vehicles can be limited by context-specific parameters, which can be, for example, a time span or an end time. Thus, for example, an approval can take place for only the upcoming 24 hours or a defined location of use or a driver identity, should the driver identity be able to be determined separately, or for a vehicle model or vehicle type.

Furthermore, the transfer of a configuration or the limitations, with respect to several vehicles, to a subsequent motor vehicle that is used after the first vehicle, or to a motor vehicle that is used temporarily, such as a rental vehicle, can be enabled.

The compilation of the pairing information can be embodied as a cryptological key and/or a character string, in particular an initial name/password pair. The pairing information can thus be generated with the use of a vehicle identification number or a part thereof, or a device name of the mobile communication terminal or a "Bluetooth User Friendly Name" or a continuous device number.

Finally, the communicative connection between the mobile communication terminal and the central computing unit of the motor vehicle can be a wired or wireless connection, wherein the wireless connection is provided by means of short-range radio interfaces.

The method according to the invention can be executed by means of a software program or a software program product, which is preferably saved onto a data carrier, if it is operated with the central computing unit.

Thus, in particular with the use of Near Field Communication (NFC) and the simplification during coupling that accompanies this according to the method according to the invention, the advantages arise that:
- even telephones without NFC benefit,
- assistance calls for customers, acquaintances, hire car users can be carried out over the internet, without the vehicle having to be entered,
- coupling for several vehicles can be carried out in a single step or can also be transferred to successively-used vehicles/"subsequent vehicles", together with other personal settings,
- the coupling can be cancelled without the vehicle having to be entered, for example if this was forgotten when returning or reselling the hire car.

BRIEF DESCRIPTION OF THE DRAWING FIGURES

The above-identified and other advantages are explained by the description below, with reference to the FIG. 1, which shows a flowchart of the coupling according to the invention in a general form.

DETAILED DESCRIPTION

The method according to the invention for the automated coupling of a telephone with a vehicle KFZ involves the use of a virtual representation area VHP of the vehicle KFZ on a vehicle home page VHP, which is provided by a server IS—see FIG. 1. Thus, from a technical standpoint, the vehicle homepage produces a connection between the vehicle KFZ on the one side and a customer or vehicle user on the other side.

To date, the identification with the vehicle has typically taken place via a clear ID, for example the VIN. The identification with the user/customer typically takes place by name/password.

According to the invention, the vehicle homepage also manages several vehicles KFZ for one user and can provide several users for one vehicle KFZ. Prior to this invention, if customers use the vehicle homepage on their smartphone the user had to register their smartphone twice: first for the use in the vehicle by means of the hands-free equipment (pairing with the vehicle) and second each time they use the vehicle homepage.

However, according to the invention, a coupling process or a login is sufficient to approve the smartphone for the respective other use as well, which is enabled by the telephone or smartphone also being able to be unlocked over the internet, for example by means of the vehicle homepage, for use in the vehicle KFZ, without a typical pairing in the vehicle having to take place. This is particularly advantageous for the frequent use of varying rental vehicles such as in the car2go system; also, in the case of company vehicles from vehicle pools or frequent exchange of the vehicle, this is a simplification if the renewed coupling of the telephone is not additionally necessary each time.

As is illustrated in FIG. 1, a smartphone that has been paired once or has been unlocked for use is also possible to be able to be unlocked for use in other vehicles without a typical pairing taking place:

In a first step, a communication connection between the mobile communication terminal SP and the internet server IS is produced.

The user then logs in (step 2) to the virtual representation area of the motor vehicle KFZ with the mobile communication terminal SP on the vehicle home page VHP.

This now leads to an exchange (step 3) of pairing information PW, so a "secret" or "login information" between the internet server IS and the mobile communication terminal SP is established, wherein the direction of the exchange is determined by the generation source of the pairing information PW.

Then a communication connection between the central computing unit HU and the internet server IS is produced for data exchange between the central computing unit HU and the virtual representation area of the motor vehicle KFZ on the vehicle home page VHP (step 4), and in step 5, the pairing information PW is exchanged between the internet server IS and the central computing unit HU.

The transfer of the pairing information PW by the mobile communication terminal SP to the central computing unit HU then follows in step 6, as well as the identification and authentication of the mobile communication terminal SP by the central computing unit HU (step 7) by means of the pairing information PW. Now, the coupling of the mobile communication terminal SP with the central computing unit HU is allowed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the automated coupling of a mobile communication terminal with a central computing unit of a motor vehicle using a virtual representation area of the motor vehicle which is present on a vehicle home page on an internet server that is located separate from the motor vehicle, the method comprising the steps:
   establishing a communication connection between the mobile communication terminal and the internet server and logging in with the mobile communication terminal into the virtual representation area of the motor vehicle on the vehicle home page;
   exchanging pairing information between the internet server and the mobile communication terminal;
   establishing a communication connection between the central computing unit of the motor vehicle and the internet server for data exchange between the central computing unit of the motor vehicle and the virtual representation area of the motor vehicle on the vehicle home page;
   exchanging the pairing information between the internet server and the central computing unit of the motor vehicle;
   transmitting, by the mobile communication terminal, the pairing information to the central computing unit of the motor vehicle;
   identifying and authenticating the mobile communication terminal by the central computing unit of the motor vehicle using the pairing information; and
   allowing the coupling of the mobile communication terminal with the central computing unit of the motor vehicle based on the authentication.

2. The method of claim 1, further comprising the step:
   processing of the pairing information by the central computing unit and the mobile communication terminal and obtaining a piece of processed information, wherein the transmission of the pairing information is the transmission of the processed information, and wherein the identification and authentication of the mobile communication terminal is carried out by the central computing unit of the motor vehicle using the processed information.

3. The method of claim 1, wherein the exchange of information between the internet server and the mobile communication terminal and between the internet server and the central computing unit of the motor vehicle is the transmission of the pairing information
   from the central computing unit of the motor vehicle to the internet server and to the mobile communication terminal,
   from the internet server to the central computing unit of the motor vehicle and to the mobile communication terminal, or
   from the mobile communication terminal to the internet server and to the central computing unit of the motor vehicle.

4. The method of claim 1, further comprising the steps:
   defining or generating the pairing information in advance using the central computing unit of the motor vehicle, the internet server, or the mobile communication terminal;
   storing the pairing information on the server and linking the paring information to the virtual representation area of the motor vehicle; and
   saving the pairing information on the central computing unit of the motor vehicle.

5. The method of claim 1, further comprising the steps:
   expiring validity of the pairing information after expiry of an access right of the mobile communication terminal to the virtual representation area of the motor vehicle on the vehicle home page or after removal of the virtual representation area on the vehicle home page; and
   deleting the pairing information on the internet server, the central computing unit of the motor vehicle, or the mobile communication terminal after the coupling between the central computing unit and the mobile communication terminal has ended.

6. The method of claim 1, further comprising the steps:
   during disconnection of the coupling of the mobile communication terminal and the central computing unit of the motor vehicle, transmitting an access denial message to the internet server by the central computing unit of the motor vehicle; and
   denying a repeat access of the mobile communication terminal to the virtual representation area of the motor vehicle on the vehicle home page if the mobile communication terminal is not coupled again with the central computing unit of the motor vehicle.

7. The method of claim 1, further comprising the step:
   configuring a cancellation condition of the automatic coupling between the mobile communication terminal and the central computing unit of the motor vehicle on the mobile communication terminal, on the central computing unit of the motor vehicle, via the mobile communication terminal, or via the virtual representation area of the server, and defining cancellation conditions.

8. The method of claim 1, further comprising the step:
   configuring automatic coupling between the mobile communication terminal and the central computing units of a plurality of vehicles, which involves exchanging the pairing information or the pieces of pairing information between the internet server and the central computing units of the plurality of vehicles and exchanging the pairing information or the pieces of pairing information between the internet server and the mobile communication terminal.

9. The method of claim 8, further comprising the step: limiting the automatic coupling between the mobile communication terminal and the central computing unit of one or more of the plurality of vehicles by at least one context-specific parameter, which comprises a time span, an end time, a location of use, a driver identity, a vehicle model, or a vehicle type.

10. The method of claim 1, further comprising the step: compiling the pairing information as a cryptological key or a character string that is an initial name/password pair,
wherein the pairing information is generated using a vehicle identification number or a part thereof, a device name of the mobile communication terminal, a Bluetooth username, or a continuous device number.

11. The method of claim 1, wherein the coupling between the mobile communication terminal and the central computing unit of the motor vehicle is a wired or wireless connection, wherein the wireless connection is provided by short-range radio interfaces.

12. A non-transitory computer-readable medium stored on a data carrier including program code, which when executed automatically couples a mobile communication terminal with a central computing unit of a motor vehicle using a virtual representation area of the motor vehicle which is present on a vehicle home page on an internet server that is located separate from the motor vehicle, by performing the steps:
  establishing a communication connection between the mobile communication terminal and the internet server and logging in with the mobile communication terminal into the virtual representation area of the motor vehicle on the vehicle home page;
  exchanging pairing information between the internet server and the mobile communication terminal;
  establishing a communication connection between the central computing unit of the motor vehicle and the internet server for data exchange between the central computing unit of the motor vehicle and the virtual representation area of the motor vehicle on the vehicle home page;
  exchanging the pairing information between the internet server and the central computing unit of the motor vehicle;
  transmitting, by the mobile communication terminal, the pairing information to the central computing unit of the motor vehicle;
  identifying and authenticating the mobile communication terminal by the central computing unit of the motor vehicle using the pairing information; and
  allowing the coupling of the mobile communication terminal with the central computing unit of the motor vehicle based on the authentication.

* * * * *